United States Patent [19]

Rösel

[11] 4,423,429

[45] Dec. 27, 1983

[54] WRITING MEDIUM UNIT FOR WRITING OR DRAWING MACHINES

[75] Inventor: Hans-Dieter Rösel, Altdorf, Fed. Rep. of Germany

[73] Assignee: J.S. Staedtler K.G., Nuremberg, Fed. Rep. of Germany

[21] Appl. No.: 317,176

[22] Filed: Nov. 2, 1981

[30] Foreign Application Priority Data

Nov. 3, 1980 [DE] Fed. Rep. of Germany ... 8029188[U]

[51] Int. Cl.³ ............................................. G01D 15/16
[52] U.S. Cl. ................................................. 346/140 R
[58] Field of Search ..................................... 346/140 R

[56] References Cited

U.S. PATENT DOCUMENTS

| 1,849,084 | 3/1932 | Hand | 346/140 |
|---|---|---|---|
| 3,065,886 | 11/1962 | Smalley, Jr. | 346/140 R |
| 3,341,860 | 12/1967 | Schweitzer | 346/140 R |
| 4,054,883 | 10/1977 | Ozone | 346/140 R |
| 4,325,072 | 4/1982 | Rösel | 346/140 R |
| 4,392,147 | 7/1983 | Rösel | 346/140 R |

Primary Examiner—Joseph W. Hartary
Assistant Examiner—D. Jennings
Attorney, Agent, or Firm—Edmund M. Jaskiewicz

[57] ABSTRACT

A writing medium unit for a writing or drawing machine comprises at least one writing unit head, a filling unit and a control unit. The filling unit is interconnected to the writing unit head and to the control unit by flexible writing medium supply tubes which are detachably connected to at least the filling unit.

9 Claims, 1 Drawing Figure

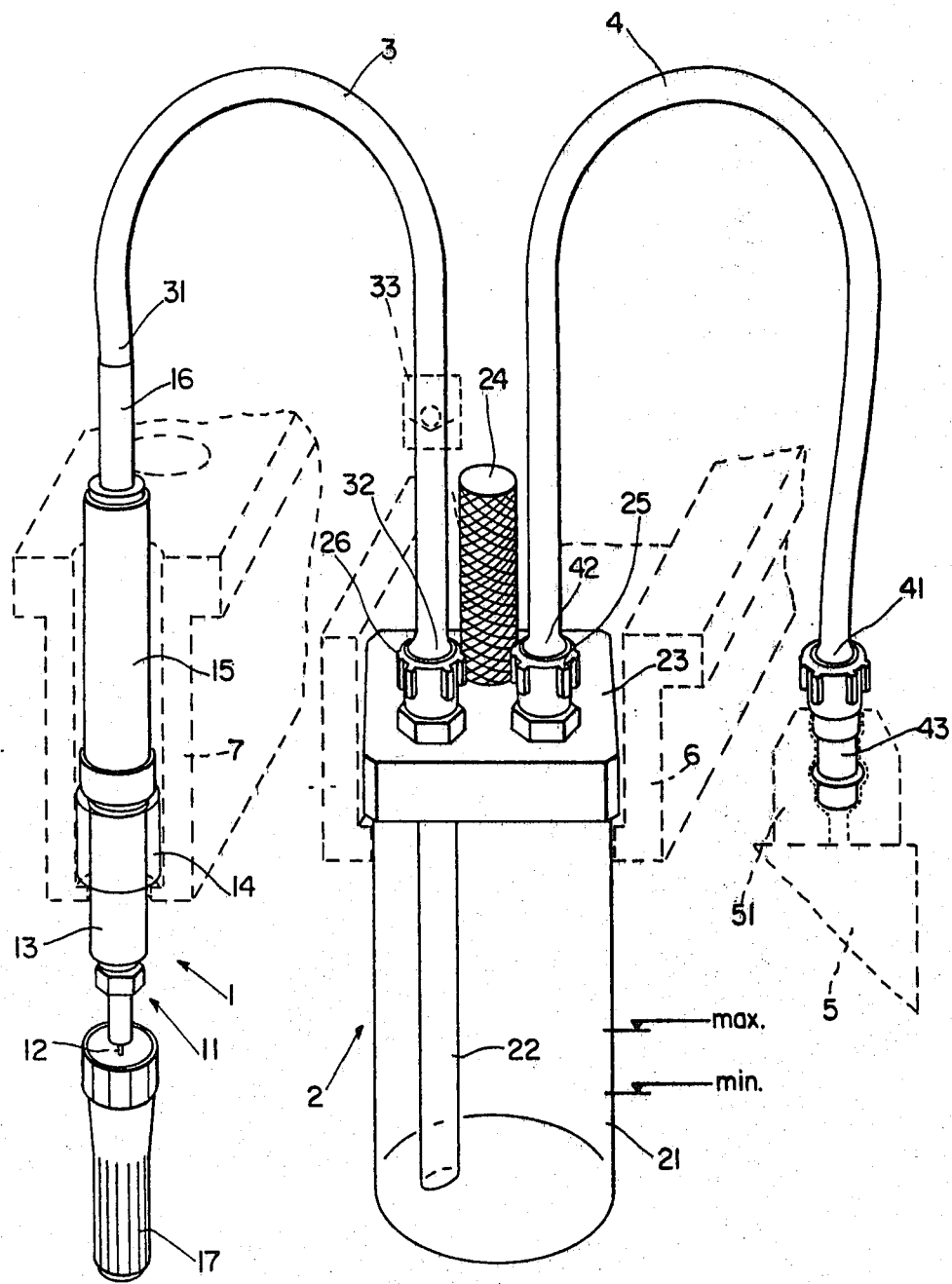

WRITING MEDIUM UNIT FOR WRITING OR DRAWING MACHINES

The present invention relates to a writing medium unit for automatic writing or drawing machines and including at least one writing unit, a filling unit, and a control unit, more particularly, to the detachable connection of the flexible writing medium flow lines between the filling unit and the writing and control units.

A writing medium apparatus of the type to which the present invention relates is in general known, for example, as in DE-AS 2 350 707. However, in this apparatus all of the components which are essential for controlling or regulating the supply of the writing medium are arranged within the drawing machine itself. As a result, it is necessary to expend a considerable effort and time to remove or disassemble the individual components, in particular those components which may require maintenance, care or replacement or periodic cleaning. Only the writing pen itself appears to be the only component which could possibly be readily removed or replaced if its connecting flow line was provided with detachable connectors. However, this possibility is not mentioned or even suggested in this patent.

In U.S. Pat. No. 4,054,883 there is disclosed a similar writing medium unit in which the control element and the writing medium container are connected by flexible flow lines. However, this patent similarly does not disclose or even suggest a ready disassembly or removable of individual components in order to facilitate cleaning or maintenance. In addition, the ink reservoir which could be considered to be a filling unit and the writing unit are contructed so that it would not be possible to replace or disassemble one of these components from the other.

It is also known to provide a writing medium unit for a recording apparatus in which both the filling and writing units are constructed as separate elements interconnected by an at least partially flexible flow line and arranged apart from each other. Such a unit is known in U.S. Pat. No. 1,849,084. However, this patent does not disclose any additional structure for the control or regulation of the supply of writing medium, and the filling unit, in particular, must be securely fastened to the base plate or housing of the recording apparatus since otherwise leaks or fastening difficulties can occur such as in the overflow pipe. As a result, the writing unit disclosed in this patent cannot be readily disassembled or components removed therefrom for cleaning or other purposes.

It is therefore the principal object of the present invention to provide an improved writing unit for a writing or drawing machine which includes at least one writing unit head, a filling unit and a control unit which are interconnected by writing medium flow lines.

It is another object of the present invention to provide such a writing unit in which those components which are most likely to require cleaning or repair are readily accessible or can be easily disassembled or removed from the unit independently of each other.

It is a further object of the present invention to provide such a writing medium unit in which the writing unit head, the filling unit, the control unit and any further regulating unit can readily disconnected from each other and removed from the unit in order to facilitate repair and maintenance.

According to one aspect of the present invention a writing unit for a writing or drawing machine and the like which includes at least one writing unit head, a filling unit and a control unit may comprise flexible writing medium supply tubes interconnecting the filling unit with the writing unit head and the control unit. The supply tubes are detachably connected to at least the filling or supply unit.

Accordingly, a respective writing unit can be releasably or detachably connected to an associated filling unit while the filling unit is itself connected by a separate control flow line to an outlet of a feeding, control or regulating unit. It is thus possible to utilize special writing tips and specific writing media and the writing unit can also be utilized as a multiple or serial arrangement having both different writing tips and utilizing different writing media varying in color or other properties.

In a multiple arrangement, only a single writing unit or several writing units can be connected in parallel to be brought into working position. In this manner, both one or more of the writing units and also the filling units even during the writing or operating phase can be exchanged for a different writing or filling unit for cleaning or refilling purposes.

Several different writing units may be connected to a single filling unit by one or more flexible writing mediums flow lines so that the filling unit functions as a central feed system for all of the connecting writing units. This arrangement will enable one to obtain practically parallel or identical lines if no separate shutoff means are provided within any of the supply ducts or added connections.

A separate writing medium unit can be connected by several flow lines to a corresponding number of filling stations so that different writing media varying in color or other properties can be supplied into the same writing unit. Where the same writing unit is supplied with different writing media it is then necessary to make sure that one writing medium is completely empty from the writing unit before a different medium is introduced. The writing unit itself may have a number of different connections to the individual writing medium flow lines.

Other objects and advantages of the present invention will be apparent upon reference to the accompanying description when taken in conjunction with the drawing, which is exemplary, and which is an overall perspective view of the writing unit according to the present invention.

According to the drawing, the writing apparatus of the present invention has a writing unit head 1 at the lower end of which is a writing tip 11 from which projects a writing tube 12 through which the writing medium is discharged upon a surface. The writing tube 11 is inserted into a tubular shaft member 13 which may be of a plastic material and has on its upper portion a removable metal sleeve 14 which may function to adapt or vary the diameter of the member 13, to form a slide bushing or may also be an additional loading mass. Extending from the upper end of the tubular member 13 is an intermediate cylindrical tank 15 on the upper end of which is a connection nipple 16.

The removable sleeve 14 may be made relatively heavy in weight in the event that the writing unit head is to be operated at an extremely high speed so as to prevent the end of the writing tube 12 from inadvertently lifting from the surface of the paper or other substrate material.

A removable closure cap 17 is provided to cover the writing tube 12 during any lengthy pause in operation. The cap 17 may be provided with a snap fastener or threaded to that portion of the shaft member 13 which projects from a receptacle 7 within which the writing unit 1 is supported. The writing unit 1 is preferably axially freely movable within the bore defining the receptacle. The receptacle may be formed on a portion of a writing or drawing machine.

The writing unit head 1 is constructed so as to be readily removable and replaceable from its mounting on the writing or drawing machine. The writing unit head is thus arranged in a correspondingly shaped and dimensioned receptacle on the writing or drawing machine or on the movable writing or drawing head or slide such that the writing unit head is movable in a vertical direction for mounting or for removal. Such an arrangement facilitates changing of the writing units heads in order to make different thicknesses of lines or for other purposes.

The writing unit heads themselves may be raised or lowered conventionally such as by use of electro-magnets or other mechanisms regulated by the control unit or are moved into and out of the writing position by such mechanisms. It is preferable that the writing unit heads be mounted only loosely in their supporting receptacles and without any additional forces being exerted on the unit heads so that the support pressure is determined solely by the weight of the writing unit head. When necessary, this force for holding the writing unit head in position in its receptacle can be varied or increased by the addition of a further sleeve or by other loading means. It is also known in the art to preset and regulate pressures or forces for retaining the writing unit head in position or for moving the writing unit head into its operating position. Also, the supply of different quanities of writing medium can be regulated electro-mechanically or pneumatically by the control unit of the writing machine and in response to the drawing speed or speed at which the writing unit head is moving with respect to the surface upon which a record is being made.

A filling or supply unit 2 comprises a writing medium container or reservoir 21 into which projects a riser tube 22 the bottom of which is positioned a short distance above the inner bottom surface of the container. The riser tube 22 extends outwardly of a container cover 23 and is provided on its outer end with an outlet nipple 26. The cover 23 also has a supply nipple or connection 25 attached thereto. A holding pin 24 which functions as a handle also projects outwardly from the cover 23 and is preferably of metal or plactic and provided with a knurled surface.

The filling unit 2 can also be provided with additional markings for indicating the level of filling and also additional filling auxilary components such as a filling nipple provided with venting channels and to which an additional reservoir or container can be connected. The filling unit 2 is loosely inserted into a slot or opening formed in a mounting 6 located on the writing or drawing machine or on an operating slide or structure of the machine. This mounting is advantageous since it permits ready removal of the filling unit from the machine to facilitate cleaning or replacement and thus eliminates the necessity for a precise fixing and additional fastening for securing a filling unit in position. A plurality of filling units can be positioned adjacent to each other by utilizing a corresponding plurality of bores within which the respective filling units are inserted. The individual bores may be replaced by a single groove into which the filling units are inserted. Spring elements may be positioned along the side of the grooves so as to provide a more secure retention of the filling units within a mounting groove. Thus, the filling unit can be removed and replaced by a vertical movement or in the case of the groove by a horizontal movement wherein the filling unit is moved horizontally into an open end of a groove.

A writing medium flow line 3 interconnects the writing unit head 1 and the filling unit 2 and has one end 32 which is detachably or releasably connected to the outlet nipple 26 of the filling unit tube and its other or outlet end 31 connected to the nipple 16 of the writing unit head 1 by a quick-releasable plug connection. The individual connection between the flow line 3 and the filling unit 2 is of the quick-release coupling construction or readily detachable coupling which may be plug units or other forms of connecting fastens. The quick-release couplings are preferable when one side of the components to be connected is to be definitely closed after removal of the coupling so that no writing medium or pressure medium can escape. In addition to the quick-release plug connection various forms of bayonet closures which are quickly releasable can also be employed. All quick-release connections used are of the type which forms liquid-tight and air-tight seals when connected.

The flow line 3 may comprise an air-tight flexible hose or tube made of various high strength flexible materials as known in the art.

A check valve 33 to function as a non-return safe guard is preferably mounted within the flow line 3 as illustrated. Such a check valve can either be of the spring type or of the non-spring type or can comprise any other device which is suitable to provide only a uni-directional flow of the medium through the flow line.

A control flow line 4 is similarly connected to the inlet nipple 25 on the filling unit 2 by means of a plug connection 42 and its other end is provided with a quick-release coupling 43 for connection to a control connection 41 mounted on an outlet 51 of a control or regulating unit 5 of the writing or drawing machine.

In order to operate the writing medium unit, a fluid pressure medium which may be compressed air is introduced through the control flow line 4 into the writing medium container 21. The resulting excess pressure within the container 21 will then push the liquid writing medium through the riser tube 22 and through the writing medium flow line 3 into the intermediate tank 15 and subsequently into the writing tip 11 and ultimately into the writing tube 12.

As the speed of drawing or writing increases, the control pressure can be increased and with decreasing drawing speed the pressure can be reduced. This change which is effected by the control or regulating unit 5 thus varies the delivery or discharge of the writing medium from the writing tube 12.

Upon completion of the writing process, the pressure in the control flow line 4 is generally abruptly decreased. Because of the different surface areas within the writing medium container 21 and the intermediate tank 15 or the riser tube 22, a slightly reduced pressure will then exist within the writing tube 12 and this will cause a small retraction of the writing medium into the writing tube 12. The writing tube is thus prevented from having writing medium on its tip when the writing unit head is being lifted from the surface or being replaced on the surface. It is apparent that the existence of a bulbous projection of writing medium on the writing tube 12 may result in drops of the writing medium being deposited upon the drawing surface or in the formation of other kinds of underdesired ink marks on the surface.

The holding pin on handle 24 on the cover 23 can serve both as a handle for opening and closing the filling unit 2 or for securing the filling unit to a correspondingly shaped mounting on the writing or drawing machine. The pin 24 can also function as a mounting auxiliary for better gripping of the entire filling unit or for moving the filling unit between positions.

When a writing unit head 1 or a filling unit 2 is to be interchanged with a corresponding component, cleaned or tested, it is only necessary to remove this component from the corresponding receptacle 7 or mounting 6 and disconnect the component from the flow line 3 and 4 or also from the outlet 51. The unit can then be repaired, cleaned or refilled without prejudicing the operating machine. When the machine is equipped with multiple writing unit heads and filling units, the disassembly or removable of a unit can occur without interrupting in any way the operating of the writing or printing machine and the machine can continue in full operation.

The writing medium units according to the present invention can be advantageously used when the writing head 1 and the filling unit 2 are utilized together as an interchangeable unit in automatic writing or drawing machines which are generally equipped with other writing and/or filling units which are not suitable for high drawing speeds (e.g. up to 1 m/sec and more) or with mechanical erasing tools and the alike but already being provided with the required control or regulating devices and also the fitting connections.

Thus it can be seen that the present invention has provided a writing medium unit particularly adapted for automatic writing or drawing machines and the like which greatly facilitates the removal of this assembly of a component for cleaning, testing or repair purposes.

It would be understood that this invention is susceptible to modification in order to adapt it to different usages and conditions and, accordingly, it is desired to comprehend such modifications within this invention as may fall within the scope of the appended claims.

What is claimed is:

1. In a writing unit for a writing or drawing machine and the like having at least one writing unit head, at least one filling unit and a control unit, flexible writing medium supply tubes interconnecting a said filling unit with a said writing unit head and said control unit, means for detachably connecting said tubes to at least said filling units to facilitate the removal and connection of said units with respect to each other, and a mounting support having an opening therein and located on a said writing or drawing machine loosely receiving and supporting each said filling unit therein and each said filling unit extending above and below the opening to permit ready removal of each said filling unit from the machine.

2. In a writing unit as claimed in claim 1 wherein there is a plurality of writing unit heads and a plurality of filling units, each said writing unit head is connected respectively by a said flexible tube to a said filling unit, and further comprising means for detachably connecting said flexible tubes to said control unit from said filling units.

3. In a writing unit as claimed in claim 1 wherein there is a plurality of writing unit heads, a plurality of filling units and a plurality of control units, each said writing unit head is connected respectively by a said flexible tube to a said filling unit, and further comprising means for detachably connecting said flexible tubes respectively to said control units from said filling units.

4. In a writing unit as claimed in claim 1 and comprising a plurality of flexible writing medium supply tubes interconnecting a plurality of writing unit heads with said filling unit, each of said tubes being detachably connected to said filling unit.

5. In a writing unit as claimed in claim 1 wherein there is a plurality of writing unit heads and each said writing unit head is detachably connected by a plurality of said flexible tubes to a plurality of filling units, there being a plurality of control units and each of said filling units being detachably connected by a said flexible tube respectively to a said control unit.

6. In a writing unit as claimed in claim 1 wherein there is a plurality of writing unit heads and each said writing unit head is detachably connected by a plurality of said flexible tubes to a plurality of filling units, said control unit being detachably connected by said flexible tubes to each of said filling units.

7. In a writing unit as claimed in claim 1 and further wherein said detachable connecting means comprises quick action couplings.

8. In a writing unit as claimed in claim 1 and further comprising a check valve in one of the flexible tube and connecting means between said writing unit head and said filling unit.

9. In a writing unit as claimed in claim 1 and further comprising means on a said writing or drawing machine for defining a receptacle in which said writing unit head can be removably received and supported and capable of axial movement therein.

* * * * *